(12) United States Patent
Aliamiri et al.

(10) Patent No.: US 11,775,827 B2
(45) Date of Patent: *Oct. 3, 2023

(54) METHODS AND SYSTEMS FOR REAL-TIME DATA REDUCTION

(71) Applicant: Samsung Electronics Co., Ltd., Suwon-si (KR)

(72) Inventors: Alireza Aliamiri, San Jose, CA (US); Yichen Shen, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/696,441

(22) Filed: Mar. 16, 2022

(65) Prior Publication Data

US 2022/0207876 A1 Jun. 30, 2022

Related U.S. Application Data

(63) Continuation of application No. 16/776,266, filed on Jan. 29, 2020, now Pat. No. 11,288,515.

(Continued)

(51) Int. Cl.
*G06V 20/40* (2022.01)
*G06N 3/045* (2023.01)
(Continued)

(52) U.S. Cl.
CPC .............. *G06N 3/08* (2013.01); *G06N 3/045* (2023.01); *G06N 20/00* (2019.01); *G06V 10/454* (2022.01);
(Continued)

(58) Field of Classification Search
CPC ........... G06K 9/00718; G06K 9/00744; G06K 9/00751; G06K 9/00765; G06K 9/4628; G06K 9/6214; G06N 20/00; G06N 3/0454

See application file for complete search history.

(56) References Cited

U.S. PATENT DOCUMENTS

| 7,769,513 B2 | 8/2010 | Breed et al. |
| 8,694,459 B2 | 4/2014 | Zadeh |

(Continued)

OTHER PUBLICATIONS

Gaurav R. Bagwe,"Video Frame Reduction in Autonomous Vehicles",2018,Michigan Technological University, Dissertations, Master's Theses and Master's Reports,pp. 9-20.*

(Continued)

*Primary Examiner* — Omar S Ismail
(74) *Attorney, Agent, or Firm* — Lewis Roca Rothgerber Christie LLP (57) ABSTRACT

A computing system for decimating video data includes: a processor; a persistent storage system coupled to the processor; and memory storing instructions that, when executed by the processor, cause the processor to decimate a batch of frames of video data by: receiving the batch of frames of video data; mapping, by a feature extractor, the frames of the batch to corresponding feature vectors in a feature space, each of the feature vectors having a lower dimension than a corresponding one of the frames of the batch; selecting a set of dissimilar frames from the plurality of frames of video data based on dissimilarities between corresponding ones of the feature vectors; and storing the selected set of dissimilar frames in the persistent storage system, the size of the selected set of dissimilar frames being smaller than the number of frames in the batch of frames of video data.

20 Claims, 9 Drawing Sheets

Related U.S. Application Data (60) Provisional application No. 62/933,827, filed on Nov. 11, 2019.

(51) Int. Cl.

| | | |
|---|---|---|
| *G06V 10/75* | (2022.01) | |
| *G06V 10/82* | (2022.01) | |
| *G06V 10/44* | (2022.01) | |
| *G06N 3/08* | (2023.01) | |
| *G06N 20/00* | (2019.01) | |
| *G06V 10/774* | (2022.01) | |
| *G06V 20/58* | (2022.01) | |

(52) U.S. Cl.
CPC ............ *G06V 10/76* (2022.01); *G06V 10/774* (2022.01); *G06V 10/82* (2022.01); *G06V 20/41* (2022.01); *G06V 20/46* (2022.01); *G06V 20/47* (2022.01); *G06V 20/49* (2022.01); *G06V 20/58* (2022.01)

(56) References Cited

U.S. PATENT DOCUMENTS

| | | | |
|---|---|---|---|
| 8,934,722 | B2 | 1/2015 | Peleg et al. |
| 10,127,438 | B1* | 11/2018 | Fisher .................. G06V 10/82 |
| 10,814,815 | B1* | 10/2020 | Rishi ..................... G06N 3/088 |
| 2009/0222388 | A1* | 9/2009 | Hua ........................ G06N 5/02 382/103 |
| 2011/0228976 | A1 | 9/2011 | Fitzgibbon et al. |
| 2017/0206431 | A1 | 7/2017 | Sun et al. |
| 2017/0278546 | A1* | 9/2017 | Xiao ..................... H04N 5/911 |
| 2017/0364766 | A1* | 12/2017 | Das ......................... G06V 20/20 |
| 2018/0204061 | A1* | 7/2018 | Antol ..................... G06N 5/025 |
| 2018/0204111 | A1* | 7/2018 | Zadeh .................. G06V 10/764 |
| 2018/0322365 | A1* | 11/2018 | Yehezkel Rohekar ..................... G06V 10/82 |
| 2018/0322371 | A1* | 11/2018 | Dupont De Dinechin .................. G06V 10/454 |
| 2018/0336424 | A1 | 11/2018 | Jang et al. |
| 2019/0033447 | A1* | 1/2019 | Chan ................ G06F 18/24133 |
| 2019/0139441 | A1* | 5/2019 | Akella .................. G06T 19/006 |
| 2019/0213742 | A1* | 7/2019 | Tang ..................... G06V 20/17 |
| 2019/0265714 | A1* | 8/2019 | Ball ..................... G05D 1/0221 |
| 2019/0384291 | A1* | 12/2019 | Michalakis ............ G06N 3/045 |
| 2020/0026949 | A1* | 1/2020 | Alcock ................. G06F 16/532 |
| 2020/0051252 | A1* | 2/2020 | Brown .................. G06F 18/214 |
| 2020/0082212 | A1* | 3/2020 | Alcock ................. G06F 18/232 |
| 2020/0202171 | A1* | 6/2020 | Hughes ................. G06F 18/214 |
| 2020/0355820 | A1* | 11/2020 | Zeng ..................... G01S 13/865 |

OTHER PUBLICATIONS

Vahid Balali,"Multi-class US traffic signs 3D recognition and localization via image-based point cloud model using color candidate extraction and texture-based recognition", Mar. 31, 2017, Advanced Engineering Informatics 32 (2017) , pp. 263-272.*

Albert S. Huang, "Finding multiple lanes in urban road networks with vision and lidar",Mar. 24, 2009, Autonomous Robots vol. 26, pp. 103-115.*

Bagwe, Gaurav R., "Video Frame Reduction in Autonomous Vehicles", Open Access Master's Report, Michigan Technological University, 2018, 37 pgs.

* cited by examiner

METHODS AND SYSTEMS FOR REAL-TIME DATA REDUCTION

CROSS-REFERENCE TO RELATED APPLICATION(S)

This application is a continuation of U.S. patent application Ser. No. 16/776,266 filed Jan. 29, 2020, which claims priority to and the benefit of U.S. Provisional Patent Application No. 62/933,827, filed in the United States Patent and Trademark Office on Nov. 11, 2019, the entire disclosure of each of which is incorporated by reference herein.

FIELD

Aspects of embodiments of the present disclosure relate to methods and systems for real-time data reduction, including in the field of collecting video data for training machine learning systems such as computer vision systems.

BACKGROUND

Machine learning systems generally compute predictions or answers based on underlying statistical models that are trained on a large collection of training data that is representative of the range of inputs that will be encountered by such systems.

As one example, some autonomous vehicles use cameras to detect surrounding objects. One technology for object detection is supervised machine learning, leveraging deep learning (e.g., deep neural networks). In such approaches, the cameras mounted on an autonomous vehicle capture images of a street scene in real-time, and supplies the images to one or more statistical models (e.g., deep neural networks) that are trained to automatically detect and classify objects within the scene. This provides autonomous driving algorithms with, substantially in real-time, semantic representations of the surroundings of the vehicle, such as the locations of pedestrians, road hazards, curbs, pavement markings, and other vehicles in the vicinity of the autonomous vehicle. In turn, the autonomous driving algorithms may use the information about the detected objects to control the vehicle, such as slowing and stopping the vehicle to avoid colliding with a pedestrian walking across the path of the vehicle.

To generate training data for training the statistical models of the computer vision systems, a large collection (e.g., thousands) of images are captured from video cameras while driving the vehicle through various conditions (e.g., different types of traffic, weather, road types, parking lots, parking structures, and the like). These collected images may then be manually annotated by human annotators (e.g., by manually specifying bounding boxes or other masks labeled with the object depicted within the masked area).

SUMMARY

Aspects of embodiments of the present disclosure relate to systems and methods for real-time reduction of data captured for the purpose of training machine learning systems.

According to one embodiment of the present disclosure, a computing system for decimating video data includes: a processor; a persistent storage system coupled to the processor; and memory storing instructions that, when executed by the processor, cause the processor to decimate a batch of frames of video data by: receiving the batch of frames of video data; mapping, by a feature extractor, the frames of the batch to corresponding feature vectors in a feature space, each of the feature vectors having a lower dimension than a corresponding one of the frames of the batch; selecting a set of dissimilar frames from the plurality of frames of video data based on dissimilarities between corresponding ones of the feature vectors; and storing the selected set of dissimilar frames in the persistent storage system, the size of the selected set of dissimilar frames being smaller than the number of frames in the batch of frames of video data.

The instructions that cause the processor to select the set of frames may include instructions that, when executed by the processor, cause the processor to: select a first reference frame randomly from the batch of frames of video data; discard a first set of frames from the frames of the batch, the first set of frames having corresponding feature vectors that are within a similarity threshold distance of a first feature vector corresponding to the first reference frame; select a second reference frame from the plurality of frames of video data, the second reference frame having a second feature vector, a distance between the first feature vector and the second feature vector may be greater than the similarity threshold distance; and discard a second set of frames from the frames of the batch, the second set of frames having corresponding feature vectors that are within the similarity threshold distance of the second feature vector, the selected set of dissimilar frames may include the first and second reference frames and excludes the first and second sets of frames.

The feature extractor may include a neural network. The neural network may include a convolutional neural network.

The computing system and the persistent storage system may be on-board a vehicle, and the batch of frames of video data may be a portion of a stream of video data captured by a video camera mounted on the vehicle, the video camera being configured to capture images of surroundings of the vehicle.

The batch of frames of video data may be captured over a first time period having a length corresponding to a capture interval, the stream of video data may include a second batch of frames of video data corresponding to video data captured during a second time period having a length corresponding to the capture interval, the second time period immediately following the first time period, and the computing system may be configured to map the frames of the batch to decimate the batch of frames of video data within an amount of time corresponding to the capture interval.

The memory may further store instructions to remove frames from the selected set of dissimilar frames based on an uncertainty metric including instructions that, when executed by the processor, cause the processor to: supply each frame of the selected set of dissimilar frames to an object detector including a convolutional neural network to compute a plurality of sets of bounding boxes identifying portions of the frame depicting instances of each object class of a plurality of object classes, each bounding box of each set of bounding boxes having an associated confidence score; compute an uncertainty score for each frame of the selected set of dissimilar frames based on the sets of bounding boxes and the associated confidence scores; and remove a set of frames from the selected set of dissimilar frames that have uncertainty scores failing to satisfy an uncertainty threshold, wherein the selected set of dissimilar frames may be stored in the persistent storage system excludes the set of frames that have uncertainty scores failing to satisfy the uncertainty threshold.

The object detector may further include a long-short term memory neural network.

The instructions to compute the uncertainty score may include instructions that, when executed by the processor, cause the processor to, for each frame: identify two highest associated confidence scores corresponding to a same portion of the frame and corresponding to different object classes; and compare the two highest associated confidence scores, wherein the uncertainty score may be high when a difference between the two highest associated confidence scores is small, and wherein the uncertainty score may be low when a difference between the two highest associated confidence scores is large.

The feature extractor may include the convolutional neural network of the object detector.

According to one embodiment of the present disclosure, a computing system for decimating video data includes: a processor; a persistent storage system coupled to the processor; and memory storing instructions that, when executed by the processor, cause the processor to decimate a batch of frames of video data by: receiving the batch of frames of video data; supplying each frame of the batch of frames of video data to an object detector including a convolutional neural network to compute a plurality of sets of bounding boxes identifying portions of the frame depicting instances of each object class of a plurality of object classes, each bounding box of each set of bounding boxes having an associated confidence score; computing an uncertainty score for each frame of the batch of frames of video data based on the sets of bounding boxes and the associated confidence scores; selecting a set of uncertain frames from the batch of frames of video data where the uncertainty score of each frame of the set of uncertain frames satisfies an uncertainty threshold, and storing the selected set of uncertain frames in the persistent storage system, the number of the selected uncertain frames being smaller than the number of frames in the batch of frames of video data.

The object detector may further include a long-short term memory neural network.

The instructions to compute the uncertainty score may include instructions that, when executed by the processor, cause the processor to, for each frame: identify two highest associated confidence scores corresponding to a same portion of the frame and corresponding to different object classes; and compare the two highest associated confidence scores, wherein the uncertainty score may be high when a difference between the two highest associated confidence scores is small, and wherein the uncertainty score may be low when a difference between the two highest associated confidence scores is large.

The computing system and the persistent storage system may be on-board a vehicle, and the batch of video data may be a portion of a stream of video data captured by a video camera mounted on the vehicle, the video camera being configured to capture images of surroundings of the vehicle.

The batch of frames of video data may be captured over a first time period having a length corresponding to a capture interval, wherein the stream of video data may include a second batch of frames of video data corresponding to video data captured during a second time period having a length corresponding to the capture interval, the second time period immediately following the first time period, and wherein the computing system may be configured to decimate the batch of frames of video data within an amount of time corresponding to the capture interval.

According to one embodiment of the present disclosure, a computing system for decimating video data includes: a processor; a persistent storage system coupled to the processor; and memory storing instructions that, when executed by the processor, cause the processor to decimate a batch of frames of video data by: receiving the batch of frames of video data; mapping, by a feature extractor, the batch of frames of video data to corresponding feature vectors in a feature space, each of the feature vectors having a lower dimension than a corresponding one of the frames of the batch; computing a plurality of dissimilarity scores based on the feature vectors, each of the dissimilarity scores corresponding to one of the frames of the batch; supplying each frame of the batch of frames of video data to an object detector including a convolutional neural network to compute a plurality of sets of bounding boxes identifying portions of the frame depicting instances of each object class of a plurality of object classes, each bounding box of each set of bounding boxes having an associated confidence score; computing a plurality of uncertainty scores based on the sets of bounding boxes and the associated confidence scores, each of the uncertainty scores corresponding to one of the frames of the batch; computing an overall score for each frame by aggregating an associated dissimilarity score of the dissimilarity scores and an associated uncertainty score of the uncertainty scores; selecting a set of frames from the batch of frames of video data where the overall score of each of the selected frames satisfies an overall frame threshold; and storing the selected set of frames in the persistent storage system, the number of the selected set of frames being smaller than the number of frames in the batch of frames of video data.

The instructions to compute the uncertainty scores may include instructions that, when executed by the processor, cause the processor to, for each frame: identify two highest associated confidence scores corresponding to a same portion of the frame and corresponding to different object classes; and compare the two highest associated confidence scores, wherein the uncertainty score may be high when a difference between the two highest associated confidence scores is small, and wherein the uncertainty score may be low when a difference between the two highest associated confidence scores is large.

The computing system and the persistent storage system may be on-board a vehicle, and the batch of video data may be a portion of a stream of video data captured by a video camera mounted on the vehicle and the video camera may be configured to capture images of surroundings of the vehicle.

The batch of frames of video data may be captured over a first time period having a length corresponding to a capture interval, the stream of video data may include a second batch of frames of video data corresponding to video data captured during a second time period having a length corresponding to the capture interval, the second time period immediately following the first time period, and the computing system may be configured to decimate the batch of frames of video data within an amount of time corresponding to the capture interval.

The feature extractor may include the convolutional neural network of the object detector.

BRIEF DESCRIPTION OF THE DRAWINGS

The accompanying drawings, together with the specification, illustrate exemplary embodiments of the present disclosure, and, together with the description, serve to explain the principles of the present disclosure.

DETAILED DESCRIPTION

In the following detailed description, only certain exemplary embodiments of the present disclosure are shown and described, by way of illustration. As those skilled in the art would recognize, the disclosure may be embodied in many different forms and should not be construed as being limited to the embodiments set forth herein. In the figures and the below discussion, like reference numerals refer to like components.

Generally, supervised training of a machine learning model involves a large collection of labeled training data. In comparative methodologies for collecting training data for computer vision systems for autonomous vehicles, cameras are mounted onto the vehicle and capture video data (e.g., at a rate of 30 to 60 frames per second, where each frame generally corresponds to a single still image) during drives through various regions and under various driving conditions. The captured video may then be reviewed by human annotators, who may label the video data, such as by drawing boxes around instances of particular preselected classes of objects (e.g., cars, trucks, pedestrians, walls, trees, road signs, traffic signals, and the like).

In some circumstances, all video captured during the drive is stored. However, storing all of the video data captured during a drive requires massive in-vehicle data storage, which can be expensive. In addition, manually labeling a large amount of data is very costly because the human annotators may need to view and label millions of frames.

In some circumstances, the driver (or other human operator) may manually activate or deactivate the camera to selectively record video clips of portions of the drive. However, this may be inefficient as because a delay between a driver's recognizing a scene that is worthwhile to record and activating the camera may cause important data to be missed. In addition, scenes that are manually selected by a driver would be subject to biases of the driver, and may not actually reflect the types of scenes that would be most useful for providing additional data that would improve the performance of a trained machine learning model.

Generally, it is beneficial to collect data that is not similar to already collected data (for example, the data that is similar to previously captured data may be redundant). Continuing the above example, video clips and images that depict a diversity of objects and that are not similar to previously collected video clips may be more beneficial than video clips depicting substantially the same objects and arrangements as previously seen. Such more "salient" clips generally have a greater impact in improving the performance of the trained machine learning models.

Accordingly, aspects of embodiments of the present disclosure relate to performing data reduction or decimation by selecting more salient portions of data to retain for training a machine learning model. Some aspects of embodiments of the present disclosure enable intelligent automatic and continuous real-time data capture within resource constrained environments (e.g., environments with limited data storage capacity or data transmission bandwidth) by selectively keeping portions of a data stream and discarding other parts of the data stream (e.g., decimating the data stream). Reducing or decimating the data through the selection of portions of a data stream reduces storage costs and also reduces human annotation costs, while retaining the benefit of obtaining additional data for improving the performance of trained algorithms.

While embodiments of the present disclosure are described herein primarily in reference to the reduction of or decimation of video data in the context of video cameras mounted on vehicles and capturing data regarding the environment in the vicinity of the vehicle, embodiments of the present disclosure are not limited thereto and may also be applied for reducing data stored in other data collection contexts.

According to one embodiment of the present disclosure, an automated image and/or video capture methodology continuously monitors a scene captured by a video camera and selects and stores only important clips and images (e.g., frames of the video) that are predicted by the system to result in improvement of the performance of a machine learning model when re-training the machine learning model using the selected important frames of the video.

Figure 1:
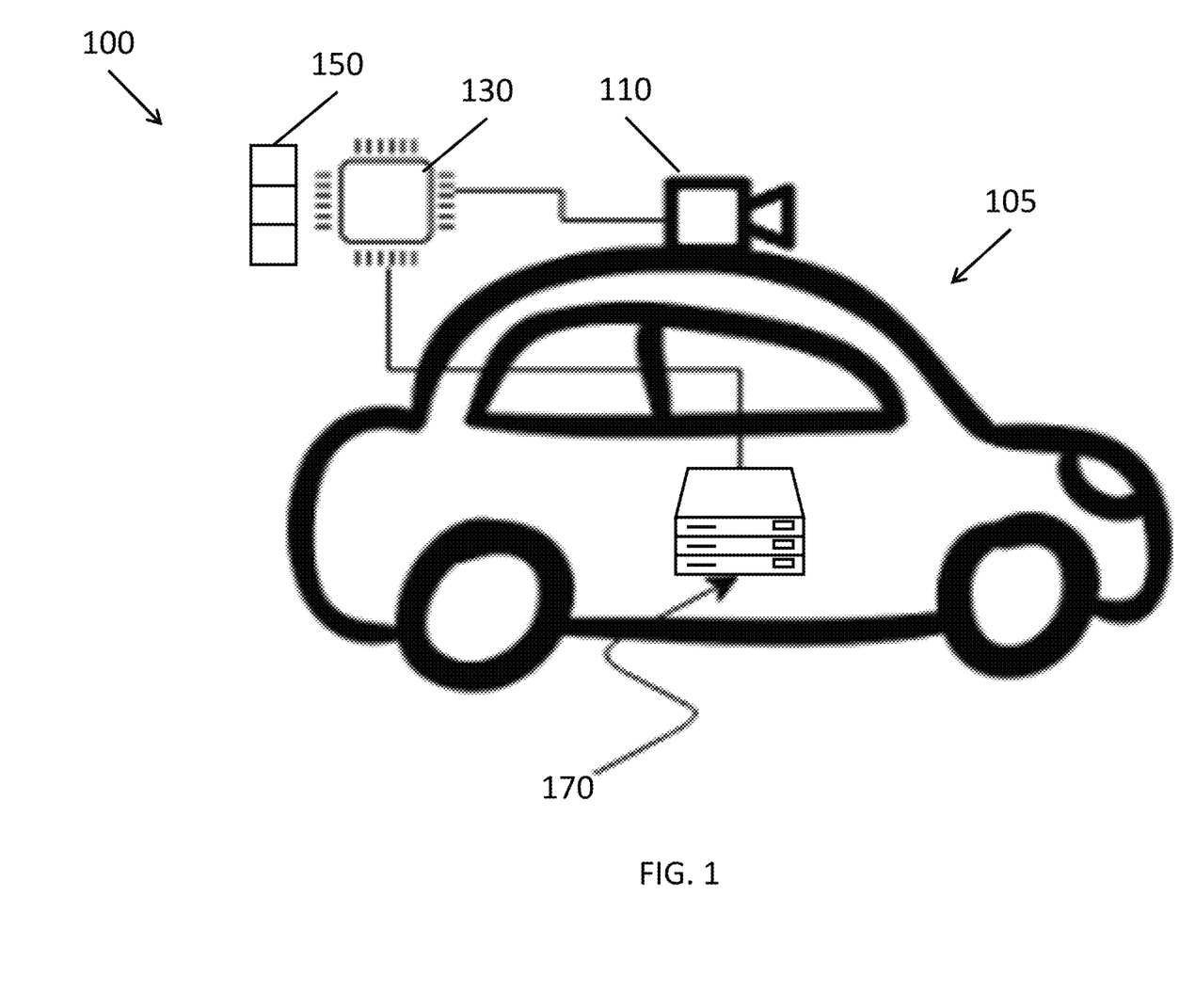
FIG. 1 is a block diagram depicting a video capture and data reduction system according to one embodiment of the present disclosure.

FIG. 1 is a block diagram depicting a video capture and data reduction system 100 according to one embodiment of the present disclosure, which is depicted as being on-board a vehicle 105. The video capture and data reduction system 100 shown in FIG. 1 includes one or more video cameras 110. In some embodiments, the video cameras 110 capture video (which includes a sequences or stream of two-dimensional still frames) at a frame rate such as 30 frames per second. The video cameras 110 generally continuously capture images during operation, that is, over the course of a drive by the vehicle 105. A computing system 130 includes buffer memory 150 (e.g., dynamic random-access memory or DRAM) which stores the video data (including the stream of frames) received from video cameras 110.

In some embodiments, the video capture and data reduction system 100 works in conjunction with an object detection system (e.g., object detection and/or scene segmentation system running on the same computing system 130 or a different computing system on-board the same vehicle). The object detection system may be used to detect and classify objects that are visible to the video cameras 110 and the detections made by the object detection may be used as an input to an autonomous driving system of a vehicle.

In some embodiments, the computing system 130 applies an active learning and novelty detection process to the frames of video data stored in the buffer memory 150 in order to select salient portions of the data stream (e.g., salient frames) that, after being annotated or labeled, are predicted to improve the performance of the object detection system when the object detection system is re-trained with a training set that includes these selected and labeled salient portions. The computing system 130 writes the selected subset of the frames to a persistent storage system 170. Examples of an appropriate persistent storage system 170 would include a mass storage system, which may include one or more flash memory units and/or one or more hard disk drives, which may be operated by a controller such as a redundant array of independent disks or RAID controller, a network-attached storage controller, a storage area network controller, and the like. As another example, the persistent storage system 170 may include a computer networking device (e.g., cellular, WiFi, and/or Ethernet) for transmitting the received data to persistent storage that is not on-board the vehicle 105 (for example, sending all captured data via a network may not be practical, but sending decimated data may be feasible). Frames that are not selected (e.g., not written to the persistent storage system 170) are considered to be redundant and are discarded (e.g., overwritten in the buffer memory).

Figure 2:
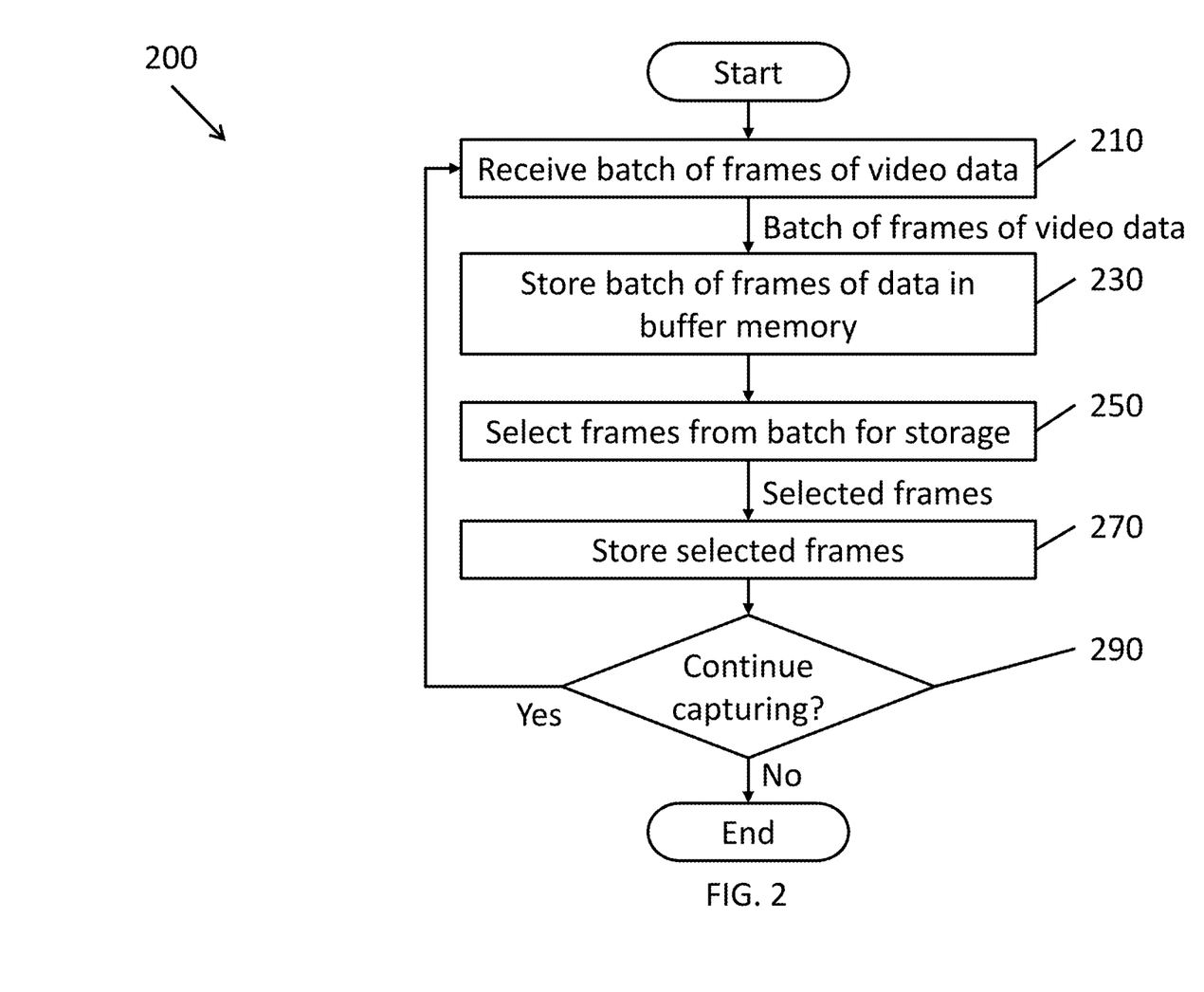
FIG. 2 is a flowchart depicting a method for reducing captured data according to one embodiment of the present disclosure.

FIG. 2 is a flowchart depicting a method for reducing captured video data according to one embodiment of the present disclosure. At 210, the computing system 130 receives a batch of data. Continuing the example above, in some embodiments, the batch of data corresponds to a batch of video frames (e.g., still images) captured by a video camera during a capture interval I. The video cameras 110 may capture data at a constant rate $f_s$ (e.g., 30 frames per second to 60 frames per second), and therefore each capture interval I includes $f_s \times I$ frames. The length of the capture interval I may depend on the size T of the buffer memory 150 (e.g., the amount of space allocated to storing a single batch of $f_s \times I$ frames of video data) and the processing speed of the techniques for selecting frames for storage such that the processing of the batch can be completed before a next batch of data is received at 210 from the video cameras 110. Accordingly, the particular parameters for the length of the capture interval I and the size of the buffer memory 150 may depend on details including the techniques for selecting frames (e.g., the algorithmic time complexities of the processes for selecting frames may place constraints on the size of the batch) and the performance of the computing system 130 in performing the method 200 (e.g., performing the selection of image frames for storage).

At 230, the computing system 130 stores a current batch of frames in the buffer memory 150. The computing system 130 may store these frames as they are received from the one or more video cameras 110 (e.g., storing a stream of video that includes individual still frames or still images). In some embodiments, the buffer memory 150 includes sufficient space to store multiple batches (e.g., at least two batches of data) such that the system can continue to receive batches of data and store the received batches in the buffer memory 150 while also processing the current frames in real-time.

At 250, the computing system 130 selects a subset of the batch of frames of video data 120 based on a prediction that the selected subset is more salient (e.g., more likely to improve the performance of a machine learning model when the machine learning model is trained based on the selected data). This may also be referred to herein as reducing the data, or filtering the data, or decimating the data. The subset will be referred to herein as a collection of selected frames, where the number of selected frames is smaller than the number of frames in the input batch of frames (e.g., the cardinality of the selected frames is smaller than the cardinality of the input batch of frames). Embodiments of the present disclosure for performing the predictions (e.g., determining the saliency of the data) will be described in more detail below.

At 270, the computing system 130 stores or writes the selected frames in the persistent storage system 170. The persistent storage system 170 stores the selected frames persistently or non-transitorily (e.g., during the entirety of and after the end of the drive along which the video cameras 110 of the vehicle 105 collect data).

At 290, the computing system 130 determines whether to continue capturing data. This determination may be made based, for example, on whether the computing system 130 has received a command to pause or to stop capturing data. If the computing system 130 is to continue capturing data, the computing system 130 continues to 210 to receive a next batch of frames of video data from the video cameras 110, where the next batch of frames of video data correspond to a time period (having a length equal to the length of the capture interval I) immediately following the previous batch of frames of video data. If the computing system 130 is to stop capturing data, then the method terminates.

According to some embodiments of the present disclosure, the video cameras 110 continuously capture images. Accordingly, video data is continuously being received, where every batch of the video data is captured over a capture interval I. As such, each iteration of the method 200, including selecting frames from the batch for storage at 250, is completed within an amount of time no longer than the capture interval I, such that the computational resources of the computing system 130 can be made available to process a next batch of frames of video data corresponding to frames captured during a second time period having a length equal to the capture interval I.

Frame Selection Based on Frame Similarity in Feature Space

According to some embodiments of the present disclosure, the computing system 130 selects frames (e.g., at 250 of FIG. 2) by selecting frames that are dissimilar from one another in a feature space. In some embodiments, this is equivalent to discarding frames that are similar to "reference" frames in a feature space. Generally, presenting many training examples that are substantially the same as one another will not cause a significant improvement in the performance of a trained machine learning system because the similar examples are redundant. Accordingly, aspects of embodiments of the present disclosure relate to increasing the efficiency of the collection of training data. by removing redundant frames and keeping only dissimilar frames.

Figure 3:
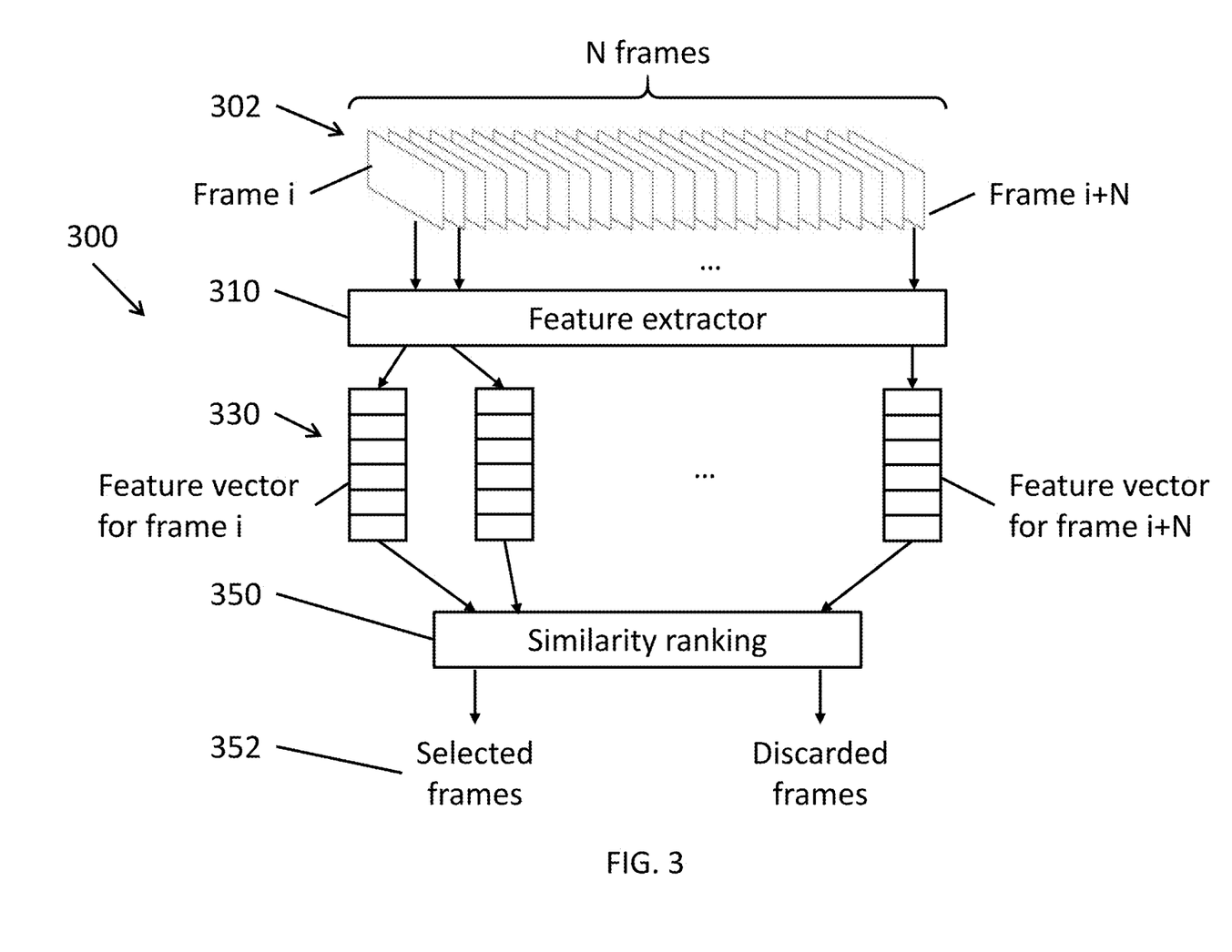
FIG. 3 is a schematic block diagram of a feature space similarity-based frame selection module according to one embodiment of the present disclosure.
Figure 4:
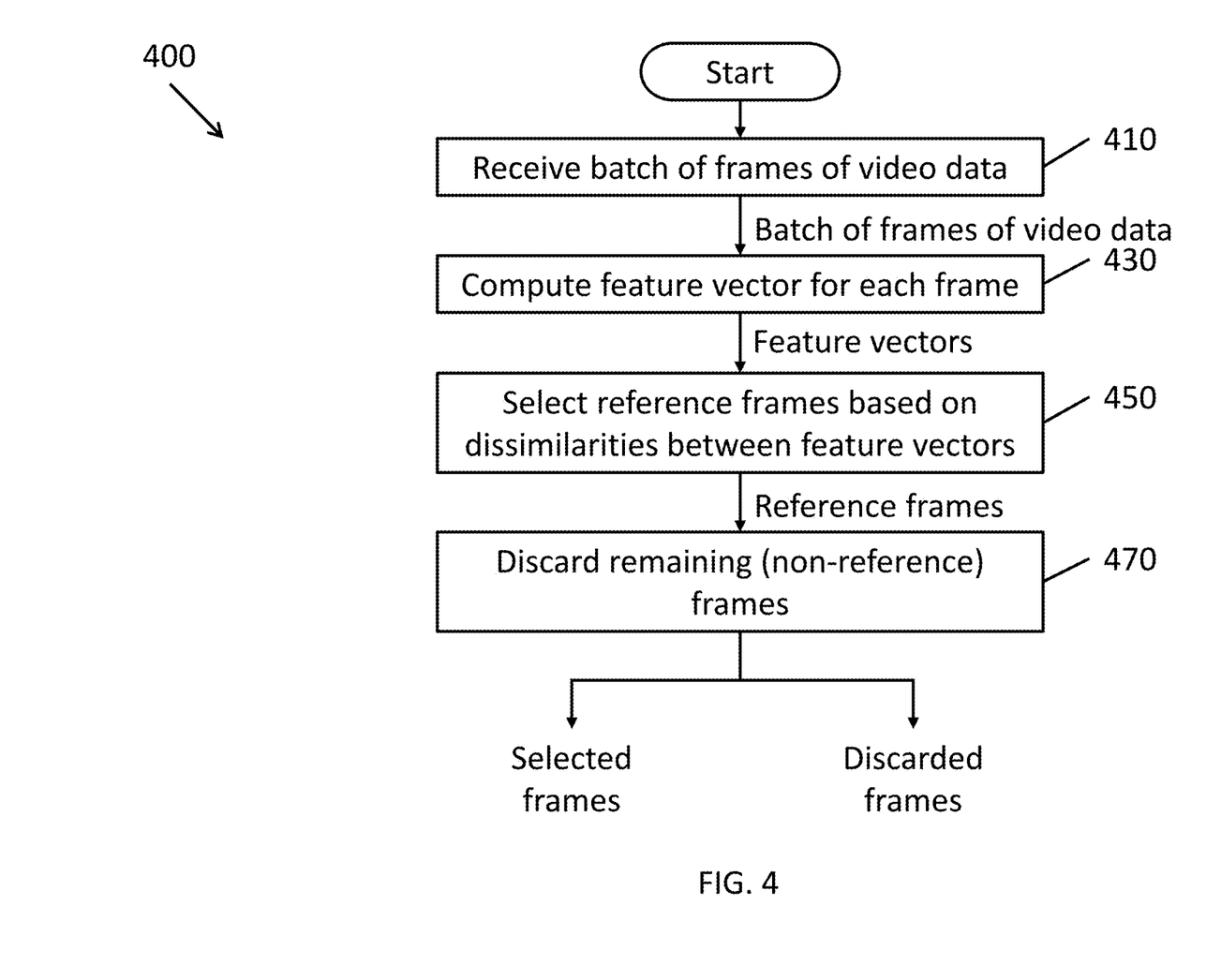
FIG. 4 is a flowchart depicting a method for frame selection by discarding frames based on similarity according to one embodiment of the present disclosure.

FIG. 3 is a schematic block diagram of a feature space similarity-based frame selection module 300 that discards frames based on similarity according to one embodiment of the present disclosure. FIG. 4 is a flowchart depicting a method for frame selection by discarding frames based on similarity in feature space according to one embodiment of the present disclosure.

Referring to FIGS. 3 and 4, at 410, the computing system 130 receives a batch of N frames of video data 302 (e.g., stored in the buffer memory 150). At 430, the computing system 130 supplies the batch of frames of data 302 to a feature extractor 310 of the feature space similarity-based frame selection module 300, which extracts feature vectors 330 from the frames, each feature vector corresponding to one of the frames of data. This may also be referred to as mapping the frames into a feature space (or latent space), where the feature space has a lower rank than the original image space of the frames of data (or the feature vectors have lower dimension than the input image). For example, each frame may have an image resolution of 2048×2048 pixels, but each feature vector may have dimensions of 256×256 pixels. For example, in such an arrangement, the feature vector would be 64 times smaller than its corresponding frame.

As such, the feature vectors can be thought of as compressing or summarizing the content of each frame of data, such that two frames that are substantially similar in terms of content map to similar feature vectors, even if the content of corresponding pixels in the frames are significantly different. For example, an image of a scene at one instant may be substantially similar, semantically, to an image of the scene one second later because the same other vehicles, pedestrians, stationary objects may be visible in both images. However, when comparing the two images at the pixel level, the two images may be very different because the locations of each of the objects within the images may have shifted (e.g., all of the objects in common between the two images may be translated due to the movement of the vehicle 105 along the street as well as the movements of the objects). Furthermore, comparing two frames of data in feature space that is of lower-rank than the input image space is less computationally intensive (e.g., because there are fewer values to compare), thereby making real-time performance of the data selection more tractable (e.g., through tuning of the size of the feature vectors).

In some embodiments of the present disclosure, the feature extractor 310 running on the computing system 130 extracts the feature vectors 330 from the frames by supplying the frames to a neural network. The feature extractor 310 may correspond to the initial stages of an object detector neural network that is trained to identify instances of objects within an image and to compute bounding boxes identifying the locations of those objects. The object detector neural network may include a convolutional neural network (CNN) combined with long-short term memory (LSTM). In such a case, the extracted features correspond to the activations (or output) of an intermediate layer of the network, prior to computing a final result (e.g., prior to computing the locations of the bounding boxes). For example, continuing the above example of a computer vision system that includes a deep convolutional neural network trained to compute labeled bounding boxes containing instances of objects of various classes in an input image, the feature extractor may correspond to an appropriate "backbone" convolutional neural network (CNN). The backbone CNN may be previously trained on a standard training corpus such as ImageNet (see, e.g., Deng, Jia, et al. "ImageNet: A large-scale hierarchical image database." 2009 *IEEE conference on computer vision and pattern recognition*. IEEE, 2009). Examples of backbone neural networks include MobileNetV2 (see, e.g., Sandler, Mark, et al. "MobileNetV2: Inverted residuals and linear bottlenecks." *Proceedings of the IEEE Conference on Computer Vision and Pattern Recognition*. 2018), MobileNetV3 (see, e.g., Howard, Andrew, et al. "Searching for MobileNetV3." *arXiv preprint arXiv*:1905.02244 (2019)), MnasNet (see, e.g., Tan, Mingxing, et al. "MnasNet: Platform-aware neural architecture search for mobile." *Proceedings of the IEEE Conference on Computer Vision and Pattern Recognition*. 2019), and Xception (see, e.g., Chollet, Franøois. "Xception: Deep learning with depthwise separable convolutions." *Proceedings of the IEEE conference on computer vision and pattern recognition*. 2017). In some embodiments, the feature extractor 310 further includes a residual neural network including several trained residual modules (or residual layers), where the residual neural network is supplied with the output of the backbone neural network, and the output of the last residual module is taken as the extracted features or extracted feature vector of an input frame.

In some embodiments, the feature extractor 310 corresponds to a portion of a neural network of the object detection system associated with the video capture and data reduction system 100. For example, if the object detection system included a convolutional neural network and a backbone neural network such as MobileNetV3, the feature extractor 310 may include the same backbone neural network.

In other embodiments of the present disclosure that are applied to different contexts such as audio processing or natural language processing, different feature extractors may be applied to perform feature extraction in a manner appropriate to the domain. For example, in audio processing, a recurrent neural network operating on spectral features (e.g., audio signals in the frequency domain) may be used as a component of the feature extractor.

At 450, the computing system 130 selects one or more reference frames from the batch of reference frames based on dissimilarities between the feature vectors using a similarity ranking module 350. In some embodiments, the computing system 130 randomly selects a seed frame from among the frames of data 302 in the buffer memory 150, and then identifies a set of frames that are dissimilar or distant from one another in feature space (e.g., that satisfy a dissimilarity threshold) based on the feature vectors corresponding to those frames. In some embodiments, an iterative algorithm such as k-Center-Greedy technique (see, e.g., Sener, Ozan, and Silvio Savarese. "Active learning for convolutional neural networks: A core-set approach." *arXiv preprint arXiv*:1708.00489 (2017)) is used to identify the set of reference frames. For example, in one embodiment using a k-Center-Greedy approach, an anchor frame F is randomly selected and added to a set of selected frames S={F} as the seed. Then, additional frames are selected based on having a lowest similarity scores to the selected frames. For example, the second reference frame F1 may be selected by finding a frame that is least similar to the seed frame F. After adding the second frame, the selected frames S include both F and F1 (S={F, F1}). A third frame F2 may be selected by choosing a frame that has lowest average similarity for the members in S (e.g., lowest average similarity to both F and F1). Frame may continue to be added this way until K frames are selected. According to another embodiment, a seed frame is randomly selected and similarity distances to that seed frame are computed for all of the rest of the frames in a neighborhood around that frame, where scoring the rest of the frames is done based on the computed similarity distances. The reference frame would have the maximum score (e.g., most similar to itself).

For example, in some embodiments of the present disclosure, during each iteration of a process for selecting reference frames, one of the frames of the batch of data is randomly. The feature vector of that frame is compared against the feature vectors of the other reference frames (the set of reference frames may be initialized by selecting a first reference frame randomly) to compute one or more similarity scores. In some embodiments, the similarity score from the comparison of two feature vectors is computed using, for example, the L1 norm (or Manhattan distance) or the L norm (or Euclidian distance) between those two feature vectors. If the similarity score of the feature vector of the current frame fails to satisfy a dissimilarity threshold (e.g., has a feature vector that is too similar to one of the current reference frames), then it is discarded. Otherwise, the current frame is added to the collection of selected reference frames. As a result, all of the reference frames are dissimilar in that their similarity scores indicate that they are at least a threshold distance (or score) apart from one another in feature space, and the computing system 130 discards sets of frames that are substantially similar to the reference frames (e.g., that have similarity scores that place them within a threshold distance, in feature space, of at least one reference frame), such that the selected reference frames exclude the discarded frames.

The number of reference frames may be configured based on a desired level of data reduction. For example, if an interval includes three hundred frames and a 90% reduction of data is desired (e.g., keeping 30 frames), then the number of reference frames may be set to 30. In operation 470, the computing system 130 discards the remaining frames (e.g., the frames that were not selected as reference frames or the "non-reference" frames). Accordingly, the reference frames are output by the feature space similarity-based frame selection module 300 as the selected frames 352.

Accordingly, according to one embodiment of the present disclosure, a feature space similarity-based frame selection module 300 relates to one method 400 for reducing data captured data by selecting representative or reference data that is different from (dissimilar to) other data in the batch, and discarding redundant data that is similar to the selected representative data.

Frame Selection Based on Frame Uncertainty

According to one embodiment of the present disclosure, the computing system 130 selects frames (e.g., at 250 of FIG. 2) by selecting frames for which the trained object detector outputs high uncertainty, and therefore additional training examples would be helpful in training the object detector to distinguish between competing possible detections (e.g., distinguishing between two classes such as "pedestrian" versus "cyclist").

Figure 5:
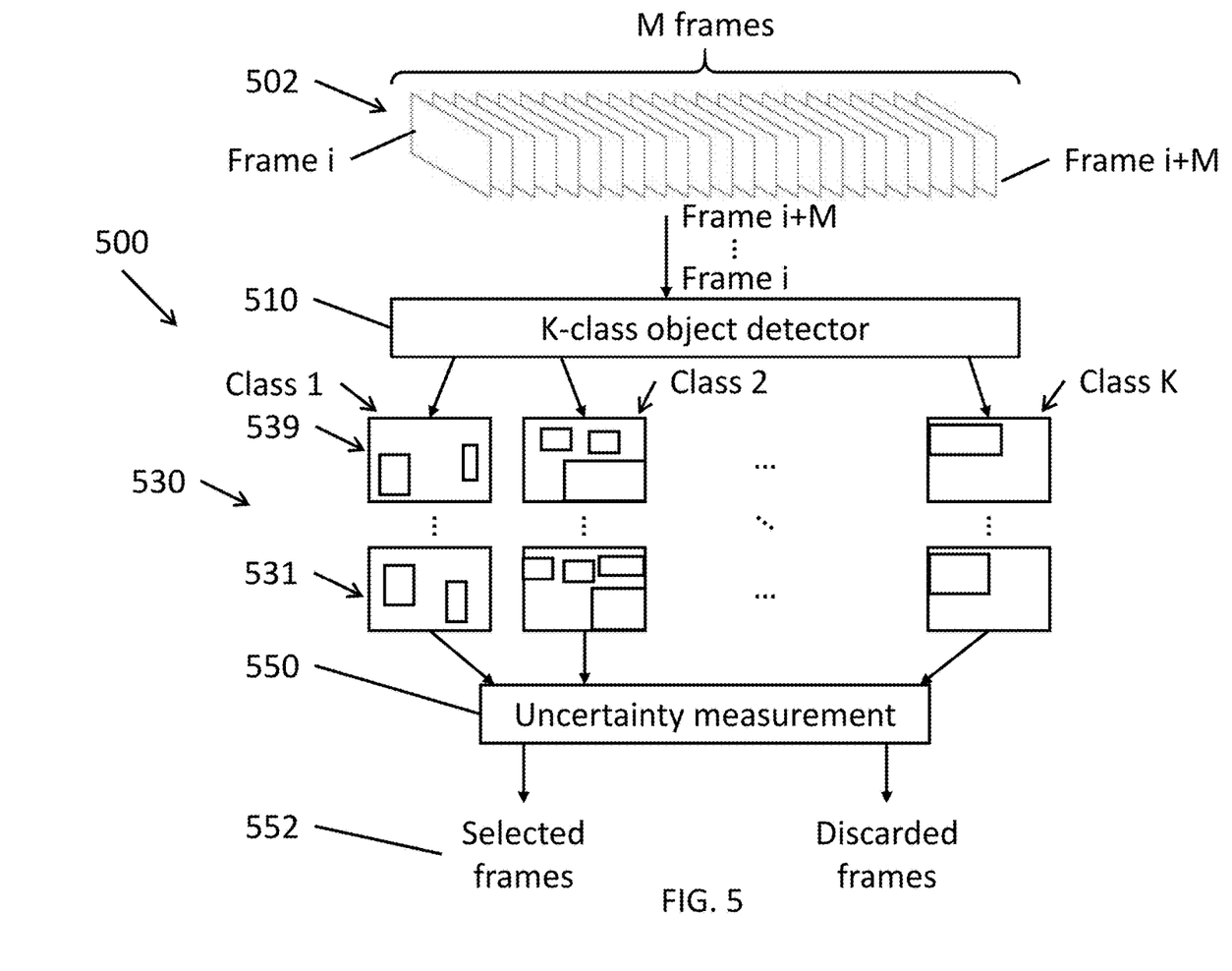
FIG. 5 is a schematic block diagram of an uncertainty-based frame selection module that discards frames based on similarity according to one embodiment of the present disclosure.
Figure 6:
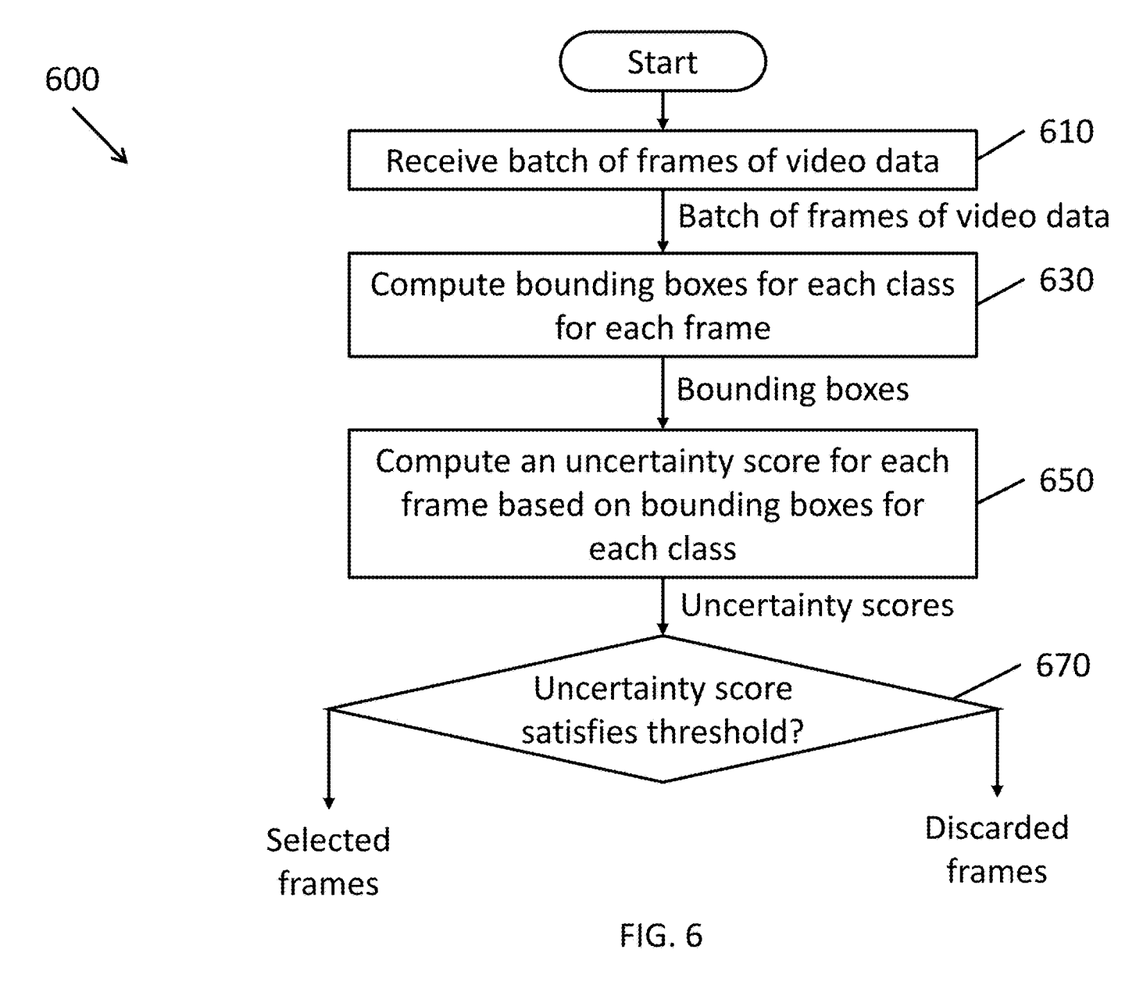
FIG. 6 is a flowchart depicting a method for frame selection by discarding frames based on an uncertainty score according to one embodiment of the present disclosure.

FIG. 5 is a schematic block diagram of an uncertainty-based frame selection module 500 that discards frames based on similarity according to one embodiment of the present disclosure. FIG. 6 is a flowchart depicting a method for frame selection by discarding frames based on an uncertainty score according to one embodiment of the present disclosure.

Referring to FIGS. 5 and 6, at 610, the computing system 130 receives a batch of M frames of input frames 502 (e.g., stored in the buffer memory 150). In operation 630, the computing system 130 supplies each of the M frames to a K-class object detector 510, which is configured to output K sets of bounding boxes 530 for each frame (for the sake of convenience, FIG. 5 shows a state where Frames i through i+M are sequentially supplied to the K-class object detector 510 to compute sets of bounding boxes 531 and bounding boxes 539 for Frame i and Frame i+M, respectively, as well as sets of bounding boxes for all frames in between Frame i and Frame i+M), where each set of bounding boxes corresponds to one of the K different classes that the K-class object detector 510 is trained to detect. Within each set of bounding boxes, for example, for a j-th class of the K classes, each bounding box corresponds to a location of a detected instance of the j-th class. Each bounding box is also associated with a probability or confidence score that the bounding box depicts an instance of the j-th class. (see, e.g., Aghdam, Hamed H., et al. "Active Learning for Deep Detection Neural Networks." *Proceedings of the IEEE International Conference on Computer Vision.* 2019.)

At 650, the computing system 130, using uncertainty measurement module 550, computes uncertainty scores for each frame based on the sets bounding boxes, and associated probabilities, for each of the K-classes. In some embodiments, a pixel-wise approach is used to compare the two highest confidence detections for each pixel of the segmentation map. In some embodiments, uncertainty scores are computed on only the selected sets of bounding boxes, which are aggregated together (one box proposal will have only one associate class probability) Techniques for computing uncertainty metrics are described in, for example, Brust, Clemens-Alexander, Christoph Käding, and Joachim Denzler. "Active learning for deep object detection." *arXiv preprint arXiv:*1809.09875 (2018), the entire disclosure of which is incorporated by reference herein. For example, "1-vs-2" or "margin sampling" may be used as a metric for the two highest scoring classes $c_1$ and $c_2$:

$$v_{1vs2}(x) = \left(1 - \left(\max_{c_1 \in K} \hat{p}(c_1 \mid x) - \max_{c_2 \in K \setminus c_1} \hat{p}(c_2 \mid x)\right)\right)^2$$

where $\hat{p}(c_i \mid x)$ represents a probability or confidence score that the bounding box (or image) x depicts an instance of class $c_i$. When the difference in confidence score $\hat{p}$ between the two highest scoring classes $c_1$ and $c_2$ for a particular bounding box (or image) x (or overlapping bounding boxes from two different classes, or for a particular pixel) is small, then the example may be close to the decision boundary (e.g., more uncertain) and therefore have a high uncertainty score, which corresponds to a more salient or useful example for training (e.g., such that the example can be manually annotated with the correct class of the bounding box x and the labeled example can be used to re-train the machine learning system). These detection metrics can then be aggregated across the various sets of classes in accordance with various techniques, such as computing a Sum of all of the $v_{1vs2}$ for all of the bounding boxes (or detections) D in a frame x:

$$V_{Sum}(x) = \sum_{i \in D} v_{1vs2}(x_i)$$

Another option is computing an Average across the detections in a frame x, e.g.:

$$v_{Avg}(x) = \frac{1}{|D|} \sum_{i \in D} v_{1vs2}(x_i)$$

Another option is computing a Maximum across the detections in a frame x, e.g.:

$$V_{Max}(x) = \max_{i \in D} v_{1vs2}(x_i)$$

In operation 670, if the uncertainty satisfies an uncertainty threshold (e.g., there is sufficiently high uncertainty in the output of the K-class object detector for the frame, then the computing system 130 selects the frame for storage as a useful example for further training. If the uncertainty score fails to meet the uncertainty threshold, then the frame is discarded.

Accordingly, according to one embodiment of the present disclosure, an uncertainty-based frame selection module 500 relates to one method 600 for reducing data captured data by selecting data for which the K-class object detector 510 has high uncertainty (e.g., for which the K-class object detector 510 does not perform well), and discarding data for which the K-class object detector has low uncertainty (e.g., inputs for which the trained K-class object detector already performs well).

According to some embodiments of the present disclosure, the computing system 130 selects frames (e.g., at 250 of FIG. 2) from the batch of frames using the feature space similarity-based frame selection module 300 and the uncertainty-based frame selection module 500, and corresponding methods, either separately (as described above) or in various combinations, such as serially (e.g., sequentially) and in parallel.

For example, in some embodiments, the feature space similarity-based frame selection module 300 and the uncertainty-based frame selection module 500 are used in series. In such embodiments, the feature space similarity-based frame selection module 300 removes duplicative frames within the batch, thereby reducing the number of frames that are be presented to the uncertainty-based frame selection module 500, and thereby also reducing the computational load on the uncertainty-based frame selection module 500. In some circumstances, such as when the processes used by the uncertainty-based frame selection module 500 have super-linear algorithmic time and/or space complexity, reducing the size of the set of input frames 502 can have a significant impact on whether the system can operate in real-time. In some embodiments, the similarity threshold is configured such that the selected number of frames allows the uncertainty-based frame selection module 500 to complete the frame selection within a time constraint (e.g., within the period of the capture interval I).

Figure 7:
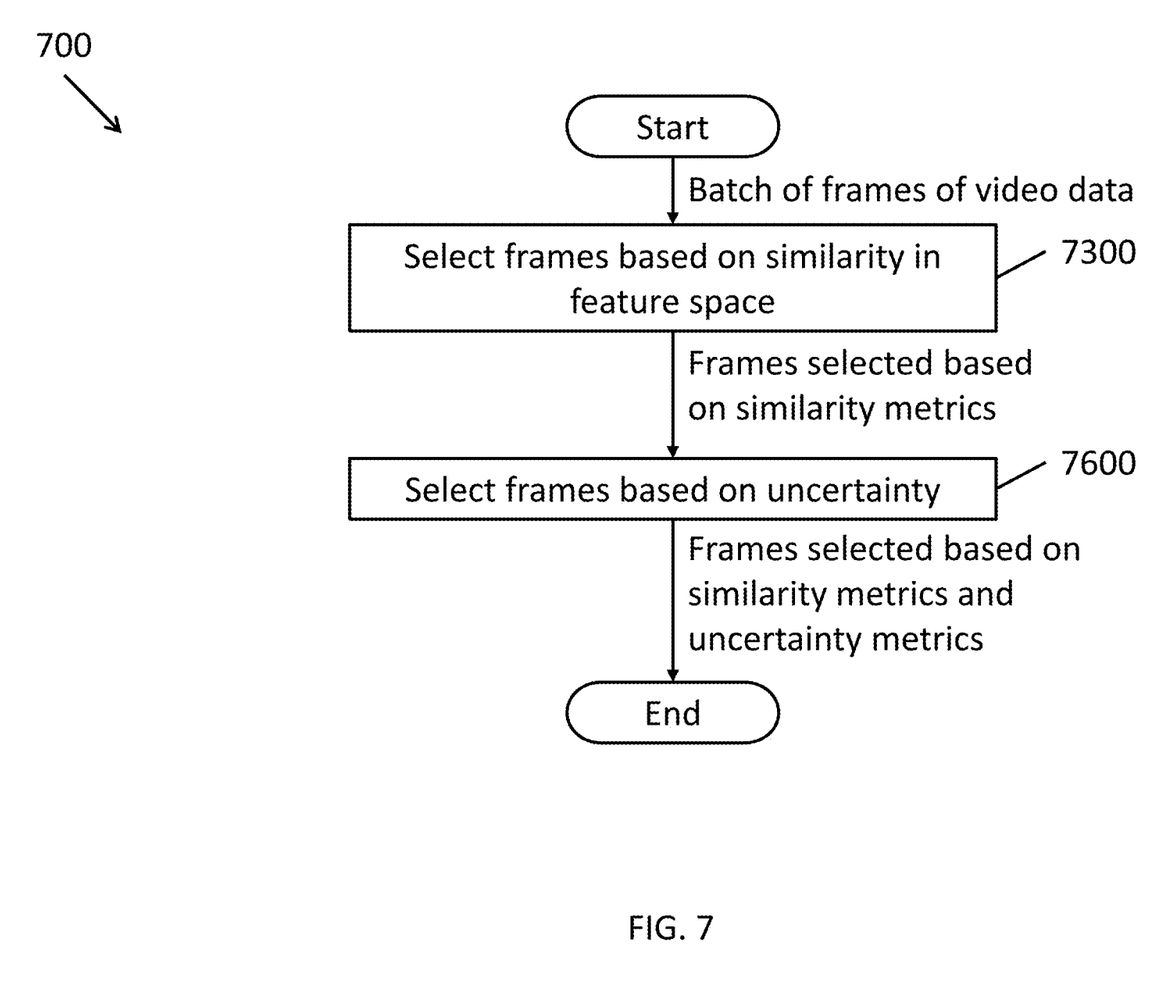
FIG. 7 is a flowchart of a method for selecting frames based on both similarity and uncertainty, in series, according to one embodiment of the present disclosure.

In some embodiments, the selected frames 352 of the output of the feature space similarity-based frame selection module 300 are supplied as an input batch of M frames 502 to the uncertainty-based frame selection module 500, which further reduces the number of frames to be stored in the persistent storage system 170 (e.g., selected frames 552). More explicitly, FIG. 7 is a flowchart of a method 700 for selecting frames based on both similarity and uncertainty in sequence according to one embodiment of the present disclosure. As shown in FIG. 7, a batch of frames (e.g., a batch of raw video data captured by the video cameras 110 during a capture interval I) processed by the computing system 130 to select frames at 7300 based on similarity in feature space (e.g., in accordance with the feature space similarity-based frame selection module 300 and the method 400 shown in FIGS. 3 and 4, respectively). The computing system 130 then processes the resulting frames (that were selected in accordance with (dis)similarity of the frames in feature space) by selecting a subset of those frames based on uncertainty (e.g., further reducing the data) at 7600 to select frames based on both a similarity metric (e.g., based on dissimilarity) and based on an uncertainty metric.

In some embodiments, rather than selecting frames, the feature space similarity-based frame selection module 300 and the uncertainty-based frame selection module 500 respectively compute similarity scores and uncertainty scores for all of the frames of data 120 received from the video cameras 110. The similarity score of each frame is aggregated or combined with the corresponding uncertainty score of the frame to compute an overall score for each frame, where frames having an overall score satisfying a threshold are selected and stored in the persistent storage system 170 and frames having overall scores failing to satisfy the threshold are discarded.

Figure 8:
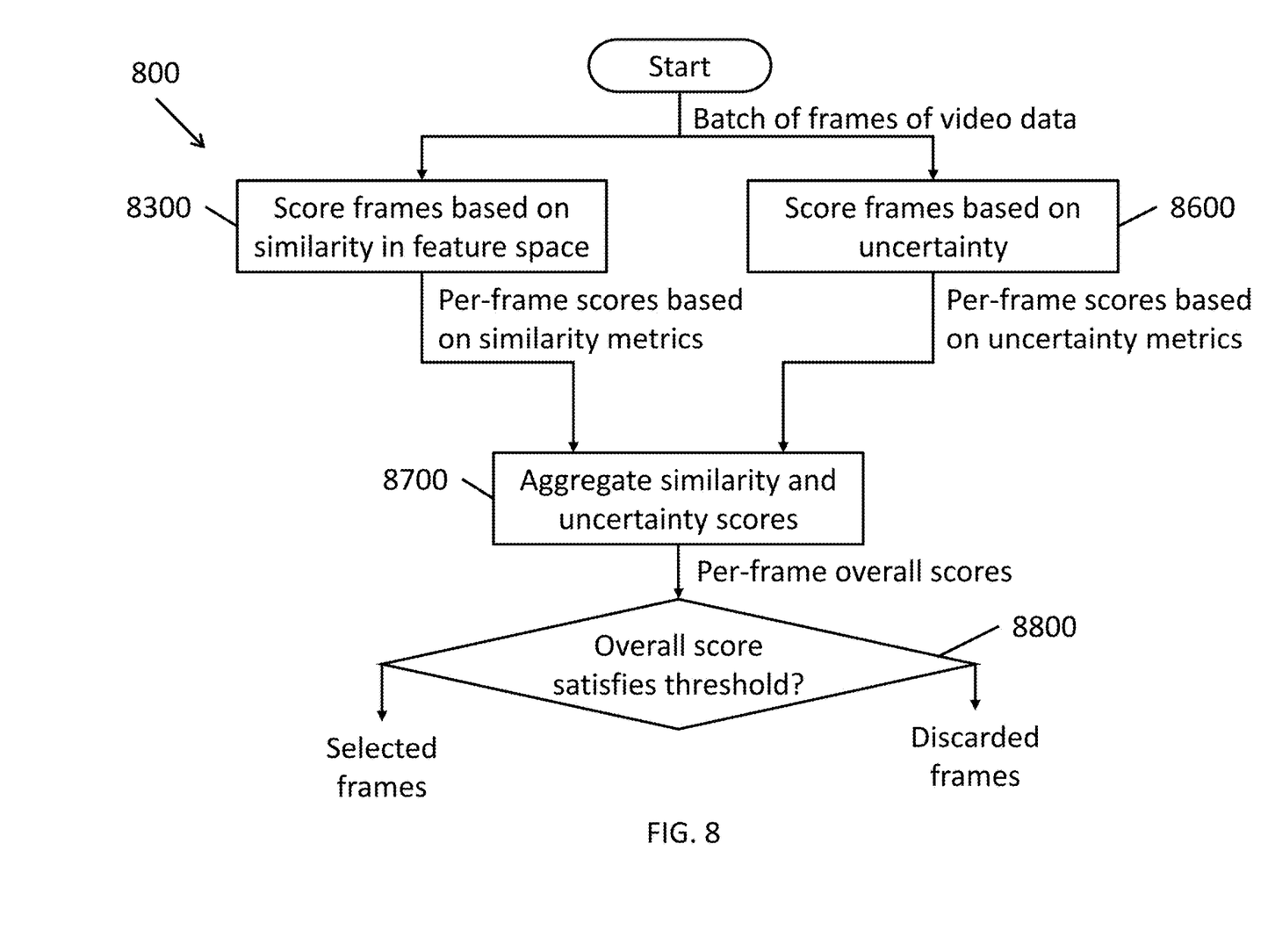
FIG. 8 is a flowchart of a method for selecting frames based on both similarity and uncertainty in parallel according to one embodiment of the present disclosure.

FIG. 8 is a flowchart of a method 800 for selecting frames based on both dissimilarity and uncertainty in parallel according to one embodiment of the present disclosure. As shown in FIG. 8, at 8300, the computing system 130 scores a batch of frames of data based on dissimilarity in feature space to compute per-frame scores based on those dissimilarity metrics (e.g., how dissimilar the frames are to selected reference frames in the set batch of frames) in a manner substantially similar to those described above with respect to FIGS. 3 and 4. In various embodiments, a Euclidean (L2) distance, a Manhattan (L1) distance, or a cosine distance (or cosine similarity) is used for calculating the similarity score in feature space. In addition, at 8600, the computing system 130 also scores the batch of frames of data (the same batch that was scored based on dissimilarity in feature space) based on uncertainty in a manner substantially similar to those described above with respect to FIGS. 5 and 6 to compute per-frame scores based on uncertainty. At 8700, the computing system 130 aggregates the dissimilarity score $d(x_i)$ and uncertainty score $u(x_i)$ for each frame to compute an overall score $o(x_i)$ for the frame. In some embodiments, this is a linear combination of the two scores, e.g.:

$$o(x_i)=ad(x_i)+(1-\alpha)u(x_i)$$

where $\alpha$ is a parameter controlling the relative weights of the dissimilarity and uncertainty scores. However, embodiments of the present disclosure are not limited thereto, and other techniques for aggregating the two scores may be used instead.

At 8800 the computing system 130 determines whether the overall score for the frame satisfies an overall frame threshold. If the overall frame threshold is satisfied, then the frame is selected for storage in the persistent storage system 170. If the overall frame threshold is not satisfied, then the frame is discarded.

In some embodiments, the feature extractor 310 of the feature space similarity-based frame selection module 300 corresponds to a portion of a neural network of the object detector of the uncertainty-based frame selection module 500. For example, if the object detector 510 system included a convolutional neural network and a backbone neural network such as MobileNetV3, the feature extractor 310 of the feature space similarity-based frame selection module 300 may include the same backbone neural network.

Figure 9:
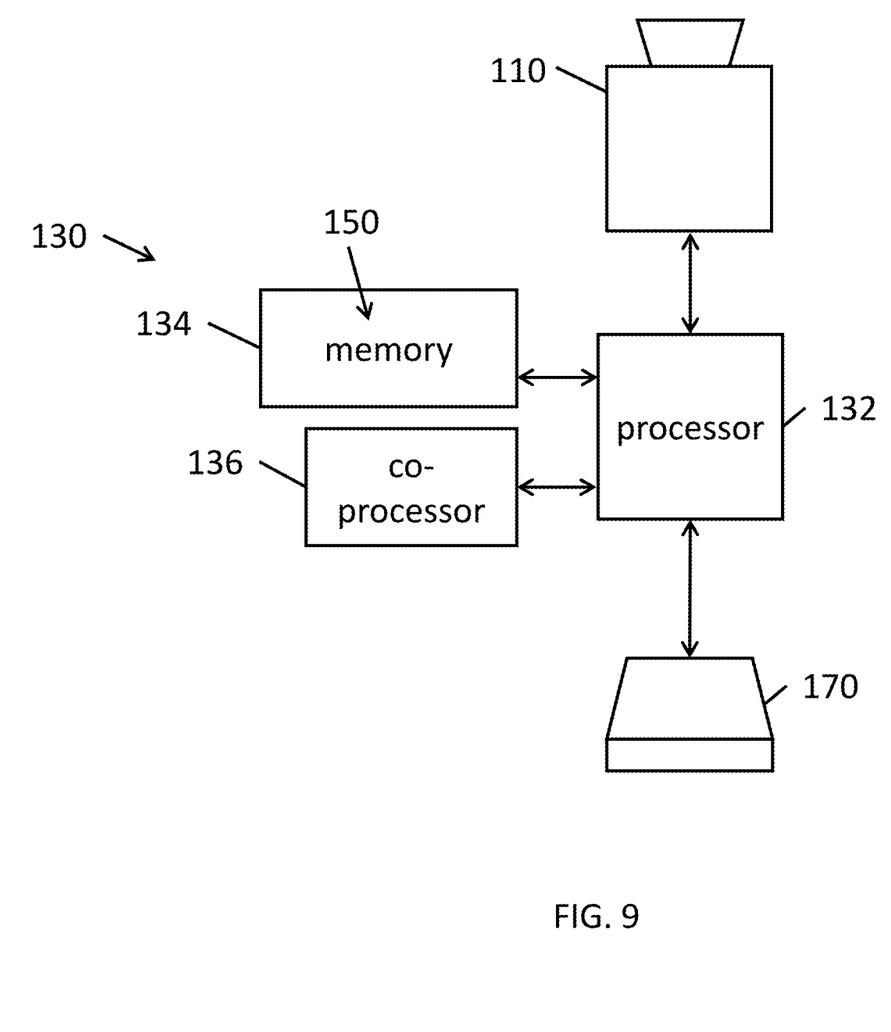
FIG. 9 is a block diagram illustrating a computing system according to one embodiment of the present disclosure.

FIG. 9 is a block diagram illustrating a computing system 130 according to one embodiment of the present disclosure. As shown in FIG. 9, the computing system 130 according to one embodiment includes a processor 132 and memory 134, where the processor may be: a general-purpose central processing unit (e.g., with one or more cores); a graphical processing unit (GPU); a field programmable gate array (FPGA); a neural processing unit (NPU) or neural network processor (NNP) (e.g., a processor having an architecture tailored to perform inference using a neural network); or a neuromorphic processor. For example, the parameters of the neural network (e.g., weights and biases) and the neural network architecture may be stored in non-transitory memory connected to the processor, where the processor performs inference using the network by loading the parameters and network architecture from memory. As another example, in the case of an FPGA, the FPGA may be configured in a non-transitory manner with the network architecture and the weights using a bitfile. The memory 134 may include the buffer memory 150 for storing the batch of data (e.g., the batch of frames of video data received from the one or more video cameras 110). The computing system 130 may further include a co-processor 136, which may include: a general-purpose CPU (with one or more cores); a GPU; an FPGA; an NPU, an NNP; or a neuromorphic processor. For example, the co-processor 136 may be separately configured to perform (and accelerate or offload) computations associated with the feature extractor 310, the K-class object detector, and the like. As noted above, the computing system 130 may be configured to store data selected by the computing system in a persistent storage system 170. In addition, the memory 134 stores instructions that, when executed by the processor 132 and/or the co-processor 136, implement the modules and methods described in accordance with embodiments of the present disclosure.

As such, aspects of embodiments of the present disclosure relate to systems and methods for data reduction. While the present disclosure has been described in connection with certain exemplary embodiments, it is to be understood that the disclosure is not limited to the disclosed embodiments, but, on the contrary, is intended to cover various modifications and equivalent arrangements included within the scope of the appended claims, and equivalents thereof.

What is claimed is:

1. A computing system for decimating video data comprising:
    a processor;
    a persistent storage system coupled to the processor; and
    memory storing instructions that, when executed by the processor, cause the processor to decimate a batch of frames of video data in real-time during capture of the video data by:
        receiving the batch of frames of video data;
        computing an overall score for each frame based on content of each frame;
        selecting a set of frames from the batch of frames of video data where the overall score of each of the selected frames satisfies an overall frame threshold; and
        storing the selected set of frames in the persistent storage system, the number of the selected set of frames being smaller than the number of frames in the batch of frames of video data.

2. The computing system of claim 1, wherein the instructions to perform the computing the overall score for each frame comprises instructions that, when executed by the processor, cause the processor to:
    map, by a feature extractor, the batch of frames of video data to corresponding feature vectors in a feature space, each of the feature vectors having a lower dimension than a corresponding one of the frames of the batch;
    compute a plurality of dissimilarity scores based on the feature vectors, each of the dissimilarity scores corresponding to one of the frames of the batch; and
    compute the overall score for each frame based on the dissimilarity scores corresponding to each frame.

3. The computing system of claim 2, wherein the instructions that cause the processor to select the set of frames comprise instructions that, when executed by the processor, cause the processor to:
    select a first reference frame randomly from the batch of frames of video data;
    discard a first set of frames from the frames of the batch, the first set of frames having corresponding feature vectors that are within a similarity threshold distance of a first feature vector corresponding to the first reference frame;
    select a second reference frame from the plurality of frames of video data, the second reference frame having a second feature vector, wherein a distance between the first feature vector and the second feature vector is greater than the similarity threshold distance; and
    discard a second set of frames from the frames of the batch, the second set of frames having corresponding feature vectors that are within the similarity threshold distance of the second feature vector,
    wherein the selected set of dissimilar frames includes the first and second reference frames and excludes the first and second sets of frames.

4. The computing system of claim 1, wherein the instructions to perform the computing the overall score for each frame comprises instructions that, when executed by the processor, cause the processor to:
    supply each frame of the batch of frames of video data to an object detector comprising a convolutional neural network to compute a plurality of sets of bounding boxes identifying portions of the frame depicting instances of each object class of a plurality of object classes, each bounding box of each set of bounding boxes having an associated confidence score;
    compute a plurality of uncertainty scores based on the sets of bounding boxes and the associated confidence scores, each of the uncertainty scores corresponding to one of the frames of the batch; and
    compute the overall score for each frame based on the uncertainty scores corresponding to each frame.

5. The computing system of claim 4, wherein the instructions to perform the computing the overall score for each frame comprises instructions that, when executed by the processor, cause the processor to:
    map, by a feature extractor, the batch of frames of video data to corresponding feature vectors in a feature space, each of the feature vectors having a lower dimension than a corresponding one of the frames of the batch; and
    compute a plurality of dissimilarity scores based on the feature vectors, each of the dissimilarity scores corresponding to one of the frames of the batch,
    wherein the overall score for each frame is computed based on the dissimilarity scores and the uncertainty scores corresponding to each frame.

6. The computing system of claim 5, wherein the object detector further comprises a long-short term memory neural network.

7. The computing system of claim 5, wherein the instructions to compute the uncertainty score comprise instructions that, when executed by the processor, cause the processor to, for each frame:
    identify two highest associated confidence scores corresponding to a same portion of the frame and corresponding to different object classes; and
    compare the two highest associated confidence scores,
    wherein the uncertainty score is high when a difference between the two highest associated confidence scores is small, and
    wherein the uncertainty score is low when a difference between the two highest associated confidence scores is large.

8. The computing system of claim 5, wherein the feature extractor comprises the convolutional neural network of the object detector.

9. The computing system of claim 1, wherein the computing system and the persistent storage system are on-board a vehicle, and
wherein the batch of frames of video data is a portion of a stream of video data captured by a video camera mounted on the vehicle, the video camera being configured to capture images of surroundings of the vehicle.

10. The computing system of claim 9, wherein the batch of frames of video data are captured over a first time period having a length corresponding to a capture interval,
wherein the stream of video data comprises a second batch of frames of video data corresponding to video data captured during a second time period having a length corresponding to the capture interval, the second time period immediately following the first time period, and
wherein the computing system is configured to map the frames of the batch to decimate the batch of frames of video data within an amount of time corresponding to the capture interval.

11. A method for decimating video data comprising:
receiving, by a processor in real-time during capture of video data, a batch of frames of the video data;
computing, by the processor, an overall score for each frame based on content of each frame;
selecting, by the processor, a set of frames from the batch of frames of video data where the overall score of each of the selected frames satisfies an overall frame threshold in real-time during the capture of the video data; and
storing, by the processor, the selected set of frames in a persistent storage system coupled to the processor, the number of the selected set of frames being smaller than the number of frames in the batch of frames of video data.

12. The method of claim 11, further comprising:
mapping, by a feature extractor, the batch of frames of video data to corresponding feature vectors in a feature space, each of the feature vectors having a lower dimension than a corresponding one of the frames of the batch; and
computing a plurality of dissimilarity scores based on the feature vectors, each of the dissimilarity scores corresponding to one of the frames of the batch,
wherein the overall score for each frame is computed based on the dissimilarity scores corresponding to each frame.

13. The method of claim 12, further comprising:
selecting a first reference frame randomly from the batch of frames of video data;
discarding a first set of frames from the frames of the batch, the first set of frames having corresponding feature vectors that are within a similarity threshold distance of a first feature vector corresponding to the first reference frame;
selecting a second reference frame from the plurality of frames of video data, the second reference frame having a second feature vector, wherein a distance between the first feature vector and the second feature vector is greater than the similarity threshold distance; and
discarding a second set of frames from the frames of the batch, the second set of frames having corresponding feature vectors that are within the similarity threshold distance of the second feature vector,
wherein the selected set of dissimilar frames includes the first and second reference frames and excludes the first and second sets of frames.

14. The method claim 11, further comprising:
supplying each frame of the batch of frames of video data to an object detector comprising a convolutional neural network to compute a plurality of sets of bounding boxes identifying portions of the frame depicting instances of each object class of a plurality of object classes, each bounding box of each set of bounding boxes having an associated confidence score;
computing a plurality of uncertainty scores based on the sets of bounding boxes and the associated confidence scores, each of the uncertainty scores corresponding to one of the frames of the batch; and
computing the overall score for each frame based on the uncertainty scores corresponding to each frame.

15. The method of claim 14, further comprising:
mapping, by a feature extractor, the batch of frames of video data to corresponding feature vectors in a feature space, each of the feature vectors having a lower dimension than a corresponding one of the frames of the batch; and
computing a plurality of dissimilarity scores based on the feature vectors, each of the dissimilarity scores corresponding to one of the frames of the batch,
wherein the overall score for each frame is computed based on the dissimilarity scores and the uncertainty scores corresponding to each frame.

16. The method of claim 15, wherein the object detector further comprises a long-short term memory neural network.

17. The method of claim 15, wherein the computing the uncertainty score comprises, for each frame:
identifying two highest associated confidence scores corresponding to a same portion of the frame and corresponding to different object classes; and
comparing the two highest associated confidence scores,
wherein the uncertainty score is high when a difference between the two highest associated confidence scores is small, and
wherein the uncertainty score is low when a difference between the two highest associated confidence scores is large.

18. The method of claim 15, wherein the feature extractor comprises the convolutional neural network of the object detector.

19. The method of claim 11, wherein the processor and the persistent storage system are on-board a vehicle, and
wherein the batch of frames of video data is a portion of a stream of video data captured by a video camera mounted on the vehicle, the video camera being configured to capture images of surroundings of the vehicle.

20. The method of claim 19, wherein the batch of frames of video data are captured over a first time period having a length corresponding to a capture interval,
wherein the stream of video data comprises a second batch of frames of video data corresponding to video data captured during a second time period having a length corresponding to the capture interval, the second time period immediately following the first time period, and
wherein the processor is configured to map the frames of the batch to decimate the batch of frames of video data within an amount of time corresponding to the capture interval.

* * * * *